S. PEACOCK.
PROCESS OF MAKING CALCIUM ALUMINATE AND OTHER PRODUCTS.
APPLICATION FILED JUNE 17, 1909.
1,000,290. Patented Aug. 8, 1911.
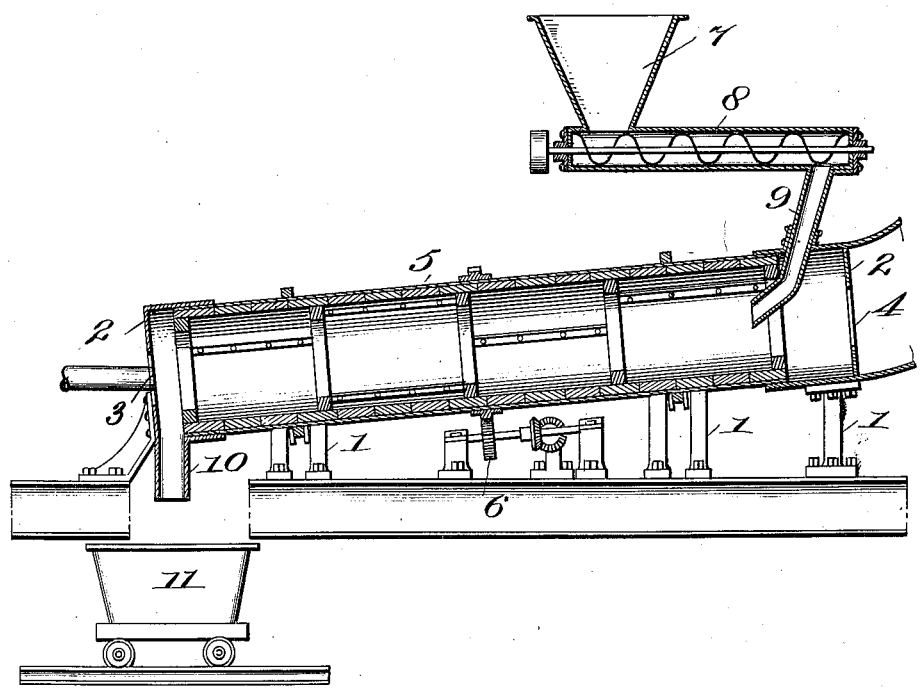

UNITED STATES PATENT OFFICE.

SAMUEL PEACOCK, OF CHICAGO, ILLINOIS, ASSIGNOR TO AMERICAN CYANAMID COMPANY, OF NEW YORK, N. Y., A CORPORATION OF MAINE.

PROCESS OF MAKING CALCIUM ALUMINATE AND OTHER PRODUCTS.

1,000,290.     Specification of Letters Patent.     Patented Aug. 8, 1911.

Application filed June 17, 1909. Serial No. 502,793.

*To all whom it may concern:*

Be it known that I, SAMUEL PEACOCK, a citizen of the United States, residing at Chicago, in the county of Cook and State of Illinois, have invented certain new and useful Improvements in Processes of Making Calcium Aluminate and other Products; and I do hereby declare the following to be a full, clear, and exact description of the invention, such as will enable others skilled in the art to which it appertains to make and use the same.

This invention relates to a process for making calcium aluminate, $CaAl_2O_4$, and the pentoxid of phosphorus, $P_2O_5$, from alumina, and calcium phosphate, and has for its object to produce a simple and comparatively cheap process for making these products in a single operation.

To this end the invention consists in the novel steps and combinations of steps constituting my process, more fully hereinafter disclosed and particularly pointed out in the claims.

Referring to the accompanying drawings, forming a part of this specification, in which the figure is a sectional diagrammatic view of a well known type of furnace suitable for carrying out my purpose:—1 represents any suitable supports; 2 stationary end closures provided with an inlet 3 for the fuel, and an exit 4 for the gases; 5 a rotating barrel part, 6 means for rotating the same; 7 a hopper for receiving the rock mixture, 8 a screw conveyer for the same, and 9 a delivery spout leading into the furnace.

10 represents a suitable delivery passage for the calcium aluminate, and 11 a suitable receptacle for receiving the same.

For the purposes of this process bauxite, or other cheap aluminous material, and phosphate rock, both of low grade, may be used, and the following analysis may be taken as a basis of calculation:—

|  | Bauxite. | Phosphate. |
|---|---|---|
| $Al_2O_3$ | 52.92 p. ct. | 2.74 p. ct. |
| $Fe_2O_3$ | 7.66 " | .52 " |
| $SiO_2$ | 10.17 " | 4.06 " |
| $CaO$ |  | 44.55 " |
| $P_2O_5$ |  | 34.30 " |
| $TiO_2$ | 2.30 " |  |
| $CO_2$ |  | 3.19 " |
| $H_2O$ | 26.90 " | 1.39 " |

The reactions involved in the aluminate manufacture are:—

$$Al_2O_3 + CaO = CaAl_2O_4$$
$$Fe_2O_3 + CaO = CaFe_2O_4$$
$$SiO_2 + 3CaO = Ca_3SiO_5$$

In making the calcium aluminate, each molecule of alumina, $Al_2O_3$, in the mixture must be supplied with one molecule of calcium oxid, $CaO$, each molecule of ferric oxid, $Fe_2O_3$, must be likewise supplied with one molecule of $CaO$, and each molecule of silica, $SiO_2$, must be supplied with three molecules of $CaO$, or in other words, a pound of $CaO$ in each of the three reactions, respectively, requires of:

| Alumina $Al_2O_3$ | 1.83 lbs. |
| Ferric oxid, $Fe_2O_3$ | 2.85 " |
| Silica, $SiO_2$ | .36 " |

That is to say, 2,000 lbs. of phosphate rock, analyzing as above, will contain and require:—

| $CaO$ | 891 lbs. | | | | |
| $Al_2O_3$ | 55 " | requiring of $CaO$ | 30 lbs. |
| $Fe_2O_3$ | 10 " | " " " | 4 " |
| $SiO_2$ | 81 " | " " " | 225 " |

Total $CaO$ required _____ 259 lbs.

As 2,000 lbs. of the above phosphate rock contain 891 lbs. of $CaO$, and only 269 lbs. of $CaO$ are required by its own alumina, ferric oxid, and silica, there remains 632 lbs. of $CaO$ to react with the bauxite in the particular example given. But, 100 lbs. of bauxite contains and requires $CaO$ as follows:—

| $Al_2O_3$ | 53 lbs. requires of $CaO$ | 29 lbs. |
| $Fe_2O_3$ | 8 " " " " | 3 " |
| $SiO_2$ | 10 " " " " | 28 " |

Total $CaO$ required _____ 60 lbs.

From this it is clear that since there are 632 lbs. of surplus $CaO$ from the 2,000 lbs. of phosphate rock to react with the bauxite, that the proper proportions of the furnace mixture for this process are:—

| Phosphate rock | 2,000 lbs. |
| Bauxite | 1,053 " |

A chemically balanced mixture of this nature being produced ground to the same fineness, and prepared, in all respects as are the ingredients in the making of Portland cement, I pass said mixture through and heat it in a suitable furnace, preferably like the one shown, to about 1400° C., to 1500° C., when the alumina reacts with the lime phosphate substantially in accordance with the following equations:—

$$3CaO.P_2O_5 + 3Al_2O_3 = 3CaAl_2O_4 + P_2O_5$$

The small quantity of ferric oxid present at the same temperature reacts substantially in accordance with the following equation:—

$$3CaO.P_2O_5 + 3Fe_2O_3 = 3CaFe_2O_4 + P_2O_5.$$

The silica reacts substantially as follows:—

$$3CaO.P_2O_5 + SiO_2 = Ca_3SiO_5 + P_2O_5$$

The calcium aluminate, $CaAl_2O_4$, is mixed with small quantities of $CaFe_2O_4$, and $Ca_3SiO_5$, but these latter compounds are in such small proportions that they do not affect the commercial value of the product; and when the reaction is completed it is passed through the exit 10 into suitable receptacles and finished for the market in the usual way. The pentoxid of phosphorus $P_2O_5$, passes out of the exit 4 and is collected in any suitable manner, as by absorption in water, or by a condensation method. From such a furnace mixture, assuming an efficiency of 95%, the phosphoric acid produced, in the example given, will be 652 lbs., for each short ton of phosphate rock and such a mixture containing 3,053 lbs. of phosphate rock and bauxite, as above, will produce 1,989 lbs. of the crude calcium aluminate.

Of course, the above proportions are merely illustrative and it is to be understood that with different supplies of bauxite and of phosphate, different proportions will obtain. It is also to be understood that my invention is not limited to mono calcium salts given as examples in the above reactions, for it is evident that I may employ the same ingredients in the proper proportions to form the various well known acid or basic calcium salts, such for example, as the di and tri calcium aluminates $Ca_2Al_2O_5$, and $Ca_3Al_2O_6$.

In charges such as the above if fusion takes place, the mass is more or less viscous or plastic and unless it is formed into thin layers the phosphoric anhydrid will not escape in any appreciable quantities. Especially is this true when the containing vessel is deep enough to cause the fused mass to exert a hydrostatic pressure, for the latter seems to have the effect of reversing the chemical equilibrium and therefore of preventing the separation of the $P_2O_5$. In order to avoid the above objections I employ the rotary furnace above disclosed and on the interior of which the material forms thin layers, whether it is fused or not; and since these layers are revolved with the furnace, if they are fused, owing to the reduction of pressure as they are carried out of the molten mass the gas easily escapes and no difficulty is therefore experienced in producing the same in quantity.

The process for making pentoxid of phosphorus, calcium silicate and aluminates, by heating phosphate rock and silica, or calcium phosphate and crude silicate of alumina, described herein is claimed in my copending application #515,803 and the process of making calcium ferrite by heating phosphate rock and iron oxid as shown herein is described and claimed in my Patent No. 988,137.

What I claim is:

1. In the process of producing the pentoxid of phosphorus and calcium aluminate from a source of alumina and lime phosphate in a single operation which consists in mixing alumina and phosphate in such proportions that chemically equivalent quantities of calcium oxid will be supplied to the alumina present in the mixture to form calcium aluminate; heating said mixture to a temperature insufficient to fuse the charge, but sufficient to form said aluminate and to free said pentoxid from the lime phosphate; while forming the heated mixture into thin layers to permit said pentoxid to escape, substantially as described.

2. In the process of producing the pentoxid of phosphorus and calcium aluminate from a source of alumina and phosphate rock in a single operation which consists in mixing an aluminiferous material and calcium phosphate in such proportions that sufficient calcium oxid will be present in the mixture to chemically react with substantially all the alumina and ferric oxid that may also be present; in heating the mixture to a temperature insufficient to fuse the charge, but sufficient to bring about such reactions and to free said pentoxid from said phosphate; while forming the heated mixture into thin layers to permit said pentoxid to escape, substantially as described.

3. In the process of producing $P_2O_5$ and $CaAl_2O_4$ from aluminiferous material and phosphate rock in a single operation which consists in mixing said material and calcium phosphate in such proportions that sufficient CaO will be present in the mixture to chemically react with all the $Al_2O_3$, the $Fe_2O_3$, and the $SiO_2$, that may be also present in said mixture; in heating said mixture to a temperature sufficient to bring about such reactions and to free the $P_2O_5$ contained in the phosphate; while forming the heated mixture into thin layers to permit said pentoxid to escape, substantially as described.

4. In the process of producing $P_2O_5$ and $CaAl_2O_4$ from bauxite and phosphate rock in a single operation which consists in suitably mixing substantially 2,000 lbs. of said rock with 1053 lbs. of bauxite, in suitably heating the said mixture to substantially 1500° C.; while forming the heated mixture into thin layers to permit said pentoxid to escape, in collecting the $P_2O_5$ driven off; and in collecting the $CaAl_2O_4$ formed; substantially as described.

In testimony whereof, I affix my signature, in presence of two witnesses.

SAMUEL PEACOCK.

Witnesses:
T. A. WITHERSPOON,
ROLAND C. BOOTH.